(12) United States Patent
Stegner et al.

(10) Patent No.: US 9,099,150 B2
(45) Date of Patent: Aug. 4, 2015

(54) METHOD AND APPARATUS FOR PHASE COHERENT STRETCHING OF MEDIA CLIPS ON AN EDITING TIMELINE

(75) Inventors: Matthew Gehring Stegner, Seattle, WA (US); Joseph Todd Orler, Kirkland, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 543 days.

(21) Appl. No.: 13/463,941

(22) Filed: May 4, 2012

(65) Prior Publication Data
US 2013/0297051 A1 Nov. 7, 2013

(51) Int. Cl.
*G06F 17/00* (2006.01)
*G11B 27/031* (2006.01)
*G11B 27/10* (2006.01)
*G11B 27/34* (2006.01)

(52) U.S. Cl.
CPC .............. *G11B 27/031* (2013.01); *G11B 27/10* (2013.01); *G11B 27/34* (2013.01)

(58) Field of Classification Search
CPC ............. G11B 27/00; G11B 20/00007; G10H 1/0008; G10H 2220/106; G10H 2240/325; G10H 2220/101; H04N 21/4398
USPC ......................................................... 704/278
See application file for complete search history.

(56) References Cited

U.S. PATENT DOCUMENTS

| | | | | |
|---|---|---|---|---|
| 5,159,141 A | * | 10/1992 | Iba .................................... | 84/619 |
| 5,781,885 A | * | 7/1998 | Inoue et al. .................... | 704/267 |
| 6,232,540 B1 | * | 5/2001 | Kondo ............................ | 84/612 |
| 8,525,012 B1 | * | 9/2013 | Yang ................................ | 84/601 |
| 2009/0019995 A1 | * | 1/2009 | Miyajima ........................ | 84/625 |
| 2010/0042407 A1 | * | 2/2010 | Crockett ..................... | 704/200.1 |
| 2011/0011245 A1 | * | 1/2011 | Adam et al. ..................... | 84/612 |
| 2012/0033132 A1 | * | 2/2012 | Chen et al. ..................... | 348/462 |

OTHER PUBLICATIONS

"Adobe Audition CS6" printed from Web Site http://www.adobe.com/products/audition.html?promoid=DINSG on Sep. 12, 2012, 2 pages.

"Apple Logic Pro 9" printed from Web Site http://www.apple.com/logicpro/ on Sep. 12, 2012, 1 page.

"Pro Tools Family" printed from Web Site http://www.avid.com/US/produts/famil/pro-tools on Sep. 12, 2012, 3 pages.

* cited by examiner

*Primary Examiner* — Curtis Kuntz
*Assistant Examiner* — Thomas Maung
(74) *Attorney, Agent, or Firm* — Keller Jolley Preece (57) ABSTRACT

Embodiments of the present invention generally relate to a method and apparatus for phase coherent stretching of audio clips on an editing timeline. The method comprising receiving a selection of a plurality of audio clips for stretching; determining a stretch ratio for the selection of audio clips based on a selection and repositioning one of a clip head or a clip tail of a selected one of the audio clips for stretching; and stretching each audio clip of the selection of audio clips by the stretch ratio, wherein during stretching, each selected audio clip remains synchronized with all other audio clips selected for stretching, by repositioning both of the clip head and the clip tail of each selected audio clip relative to the editing timeline, except for one clip head or clip tail which is not repositioned.

18 Claims, 5 Drawing Sheets

METHOD AND APPARATUS FOR PHASE COHERENT STRETCHING OF MEDIA CLIPS ON AN EDITING TIMELINE

BACKGROUND OF THE INVENTION

1. Field of the Invention

Embodiments of the present invention generally relate to editing multimedia clips on an editing timeline and, more particularly, to a method and apparatus for phase coherent stretching of audio clips on an editing timeline.

2. Description of the Related Art

Within the context of audio editing, time compression and/or expansion, also known as "stretching" is a process of editing audio clips that modifies the time duration of the clip. Such stretching changes the speed (tempo) of an audio clip, while optionally leaving the pitch of the audio signal intact. Stretching is utilized, for example, when one wishes to change the speed of a section of a prerecorded voice without changing the timbre of the voice. Most multimedia editing programs include a timeline as part of their graphical interface, for depicting multiple sources of the video and audio components that comprise a multimedia presentation as a plurality of individual audio and video clips. The clips are arranged in tracks on the timeline in a time-parallel manner which extends in a linear fashion horizontally across a display of the graphical interface. Much of the audio and video editing that takes place is done within this displayed timeline, thus use of the phrase "editing timeline".

Each clip has a start time and end time, identifying where the clip starts playing on the timeline and where the clip stops playing on the timeline. Each clip also has an "in-point". A clip in a timeline is not the actual source audio file. Rather, it is a representation of the source audio file. During the editing process, the clip may be "trimmed". For example, if a clip is placed at time zero (0) on the timeline, the user may trim the left edge of the clip (the clip's start) such that the clip's start is now at 20 seconds on the timeline. By doing this, the start of the clip represents the 20 second point within the audio source file. This is considered the "in-point". Therefore, the start time of the clip does not always represent the start of the source audio file. Before trimming, the in-point was 0. After trimming, the in-point was 20 seconds.

It is critical to keep two clips in a timeline playing at the same rate (in sync, also called "phase coherent") when, for example, content of a video clip is synced to content of an audio clip, as well as to keep content of multiple parallel audio clips synced with respect to each other. In order to accomplish this, the video and audio clips are linked so when a user drags the video clip portion in a timeline so as to change one of its start time or end time, the linked audio clip moves with it. As long as the audio and video clips have the same start times and end times, the content of the audio and video clips remain in sync.

However, using traditional editing techniques, when stretching a set of grouped media clips on an editing timeline that have different start times and end times, the start times of the selected clips are static. Because the start times of the selected clips do not move during stretching, the clips shift out of relative time from each other, causing the audio to lead or lag behind the video or audio in other clips. This is commonly seen in a talking-head video where the audio no longer matches the mouth movements of the speaker, resulting in a poor user experience. For correction of this problem, an additional step is required to individually re-position the audio and video clips on the editing timeline after a given audio clip or group of audio clips has been stretched. Attending to this additional step can lead to an error and is also time consuming and therefore undesirable.

Therefore, there is a need in the art for a method and apparatus for phase coherent stretching of audio clips on an editing timeline.

SUMMARY OF THE INVENTION

Embodiments of the present invention generally relate to a method and apparatus for phase coherent stretching of audio clips on an editing timeline. The method comprises receiving a selection of a plurality of audio clips for stretching and then determining a stretch ratio for the selection of audio clips based on a selection. The method then repositions one of a clip head or a clip tail of a selected one of the audio clips for stretching. Finally, each audio clip of the selection of audio clips is stretched by the stretch ratio, wherein during stretching, each selected audio clip remains synchronized with all other audio clips selected for stretching, by repositioning both of the clip head and the clip tail of each selected audio clip relative to the editing timeline, except for one clip head or clip tail which is not repositioned.

While the method and apparatus is described herein by way of example for several embodiments and illustrative drawings, those skilled in the art will recognize that the method and apparatus for providing for phase coherent stretching of media clips on an editing timeline is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for phase coherent stretching of media clips on an editing timeline defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention relate to a method and apparatus for phase coherent stretching (i.e., expansion or compression) of audio clips on an editing timeline. Embodiments of the present invention treat all clips as one large clip with a single start and end time. Embodiments of the present invention enable movement of an individual clip relative to the entire set of clips, while keeping the entire amount of time expansion or compression the same relative to the timeline. This moves shorter clips' beginning and end times forward and back in time by relative amounts compared to other clips in the group. After phase coherent stretching, the audio in each clip remains in synchronization with the audio of other clips being stretched. The method determines an anchor point for the set of selected clips. When either one of an expansion or compression is performed, a stretch ratio is calculated and applied to each selected clip. Based on the ratio, a new start time and end time are calculated for each of the selected clips. After phase coherent stretching is complete, the audio in each clip remains synchronized with the audio in the other clips being stretched. As used herein, the term terms "stretch", "stretched" and "stretching" are meant to include both expansion and compression.

Various embodiments of a method and apparatus for phase coherent processing of media clips on an editing timeline are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. For example, although the invention is discussed using the exemplary embodiment of audio clips on an editing timeline, the phase coherent processing may be applied to any multimedia clips in an editing timeline.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
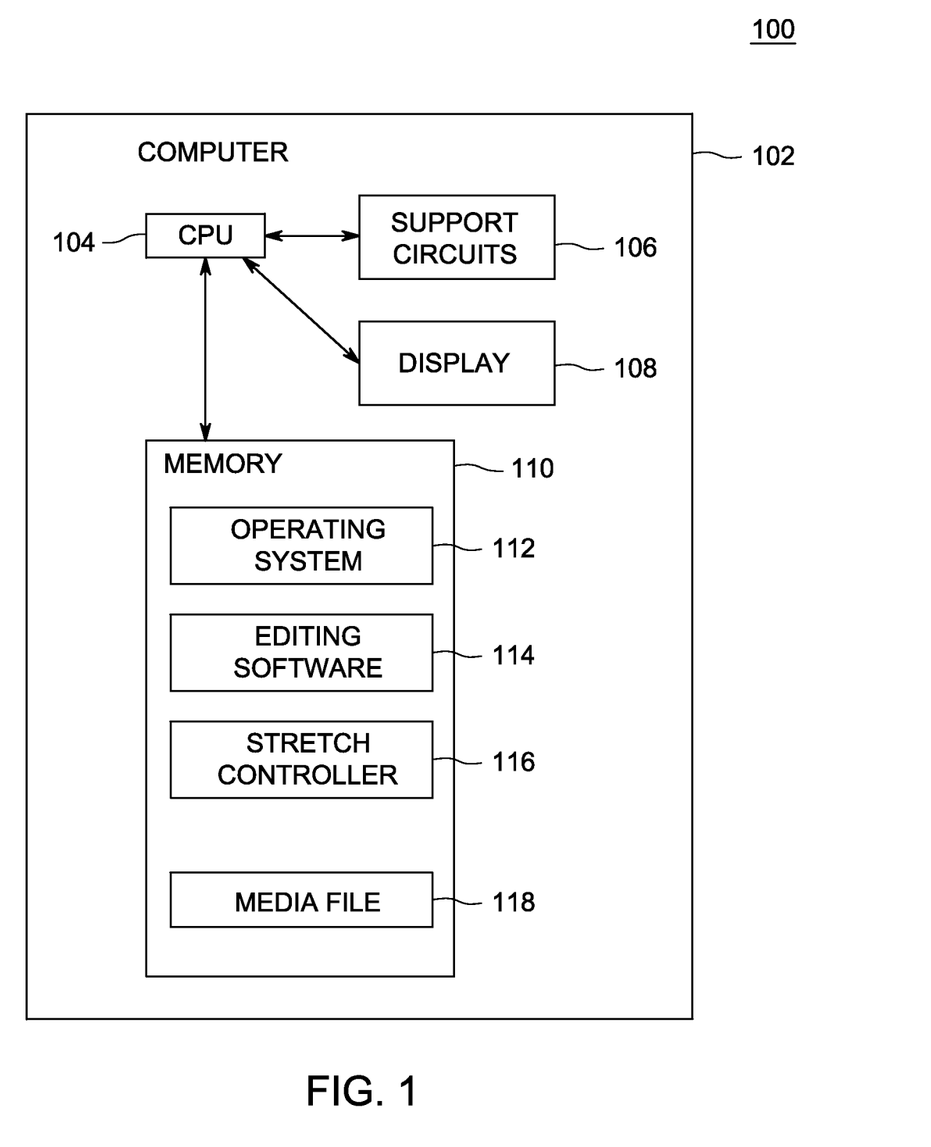
FIG. 1 depicts a block diagram of a system for phase coherent stretching of media clips on an editing timeline, according to one or more embodiments.

FIG. 1 depicts a block diagram of a system 100 for phase coherent stretching of media clips on an editing timeline, according to one or more embodiments.

The computer 102 is a type of computing device (e.g., a laptop, a desktop, and/or the like) known to one of ordinary skill in the art. The computer 102 comprises a Central Processing Unit (CPU) 104, support circuits 106, a display 108, and a memory 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 comprises at least one of Read Only Memory (ROM), Random Access Memory (RAM), disk drive storage, optical storage, removable storage and/or the like. The memory 110 comprises an operating system 112, editing software 114, a stretch controller 116, and a media file 118. The editing software 114 may be any software application, such as ADOBE® Audition, ADOBE® PREMIER Pro®, ADOBE® CS5 Production Premium, ADOBE® Encore, ADOBE® AfterEffects, ADOBE® OnLocation, ADOBE® Premier Elements, ADOBE® Premier Pro, ADOBE® Soundbooth, ADOBE® Flash Professional and the like, capable of editing the media file 118.

According to some embodiments, the operating system (OS) 112 generally manages various computer resources (e.g., network resources, file processors, desktop application, code generator and/or the like). The operating system 112 is configured to execute operations on one or more hardware and/or software modules, such as Network Interface Cards (NICs), hard disks, virtualization layers, firewalls and/or the like, as well known by those of ordinary skill in the art.

The stretch controller 116 facilitates phase coherent processing of media clips on the given timeline. When clips are selected for stretching, the stretch controller 116 sets a stretch anchor for the set of clips, calculates a stretch ratio for the stretch, and applies the ratio to each clip in the set. After the expansion or compression is complete, the audio in each clip in the set remains synchronized with the audio in the other clips being stretched.

The display 108 presents a user interface. Specifically, the display 108 exhibits one or more clips overlapping in time in an editing timeline of the user interface.

Figure 2A:
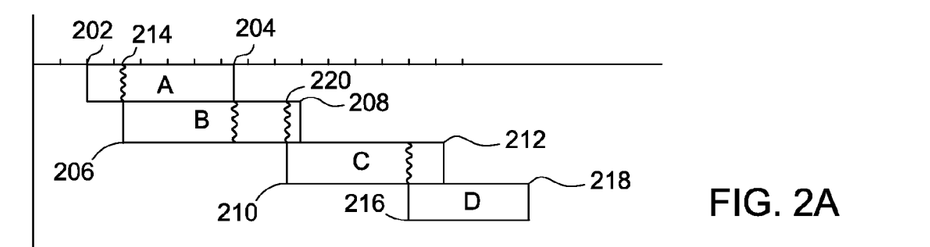
FIGS. 2A-C depict a user interface of the system of FIG. 1, according to one or more embodiments.

FIG. 2 depicts a user interface 200 of the system 100 of FIG. 1. For purposes of clarity and expediency, the four clips may be referred to as clips A, B, C and D respectively.

Each clip has a "clip head," which is the start time of a clip, and a "clip tail," which is the end time of a clip.

A set of clips, for example the three clips A, B, and C may be selected from the four clips. Thus, the three selected clips A, B, and C are referred to as a "set of clips."

The leftmost clip head among all clips in the set of selected clips is referred to as a "clip set head." For example, where clips A, B, and C are selected, the clip set head is the clip head 202 of the clip A, because the clip A is the leftmost clip in the set of selected clips.

Likewise, the rightmost clip tail among all clips in the set of clips is referred to as a "clip set tail." In the present example, the clip set tail is the clip tail 212 of the clip C, because the clip C is the rightmost clip in the set of selected clips.

A "stretch handle" is an edge in a clip on which a user can click and drag a mouse in order to stretch one or more clips.

A "stretch anchor" is a time position relative to which all clips stretch. The edge at the anchor position does not move, irrespective of whether it is a clip set head or a clip set tail. All other clips stretch relative to this anchor position. For example, the stretch anchor is a "Stretch Head" if the user drags from a stretch handle at the tail of a clip in the set. Conversely, the stretch anchor is a "Stretch Tail" if the user drags from a stretch handle at the head of a clip in the set.

The "primary clip" is the one clip in the set with which the user has selected for interaction, such as by user operation of the mouse.

Figure 2B:
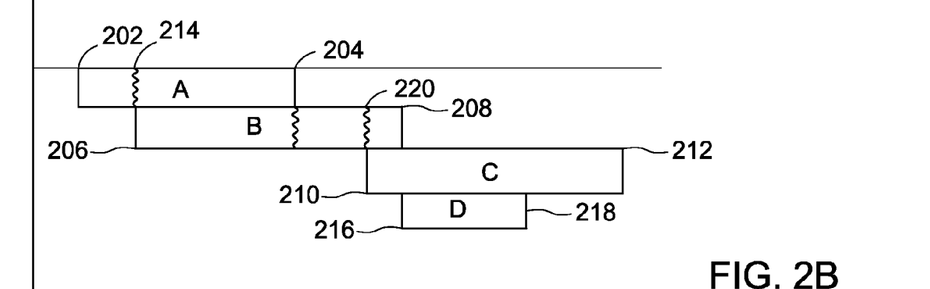
Figure 2C:
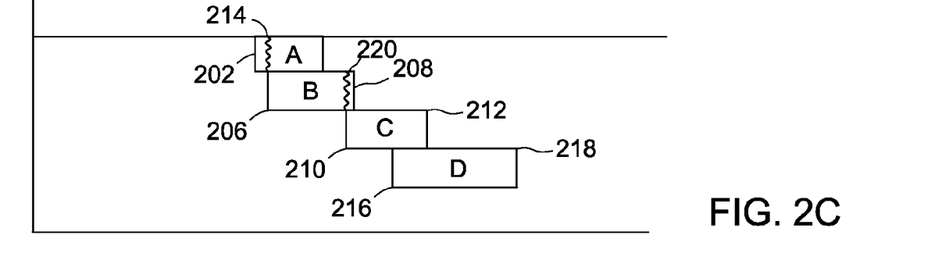

The "stretch ratio" is a percentage amount of stretching. A value of stretch ratio greater than one indicates clip expansion as depicted in FIG. 2B, whereas a stretch ratio value less than one indicates clip compression as depicted in FIG. 2C. Accordingly, as noted above, when not inconsistent with a specific embodiment described herein, the terms "stretch", "stretched" and "stretching" are meant to include both expansion and compression.

Of note is the fact that when a sound cue 214 plays in clip A, that cue coincides with the beginning of clip B. A sound cue 220 at the end of clip B coincides with the beginning of clip C. After the clips are expanded or compressed in accordance with some embodiments of the invention, these cues will continue to coincide, i.e., remain in synchronization.

FIG. 2B depicts the clips after expansion using a clip tail as the stretch handle. Clip A, clip B, and clip C are selected for stretching. The user performs a mouse down (the gesture of pressing on the mouse button and holding it down) on the clip tail of clip C 212. This becomes the stretch handle. Because the stretch handle is the clip tail of clip C 212, the stretch anchor will be the clip head of clip A 202. This stretch anchor point will not move during expansion. The user drags the mouse and pulls the stretch handle (clip tail 212). Each clip has its start and end points recalculated accordingly. When the phase coherent stretching is complete, the sound cue in clip A 214 is still synchronized with the start of clip B 206 and the sound cue near the end of clip B 220 is still synchronized with the start of clip C 210.

FIG. 2C shows clips after compression using a clip head as the stretch handle. Clip A, clip B, and clip C are selected for stretching. This time, however, the user performs a mouse down on the clip head of clip A 202. This becomes the stretch handle. Because the stretch handle is the clip head of A 202, the stretch anchor will be the clip tail of clip C 212. This anchor point will not move during compression. The user drags the mouse and moves the stretch handle and compresses the set of clips. Each of the selected clips has its start and end points recalculated accordingly. When the phase coherent compression is complete, the sound cue in clip A 214 is still synchronized with the start of clip B 206 and the sound cue near the end of clip B 220 is still synchronized with the start of clip C 210.

It is noted that the invention described herein is not limited to any specific manner of indicating the stretch amount, such as the fore noted "mouse down and drag" technique, and other techniques are equally applicable. For example, a user may use a keyboard to indicate selection of a particular audio clip, as well as to numerically input a stretch amount to be applied to the clip head or clip tail.

Figure 3:
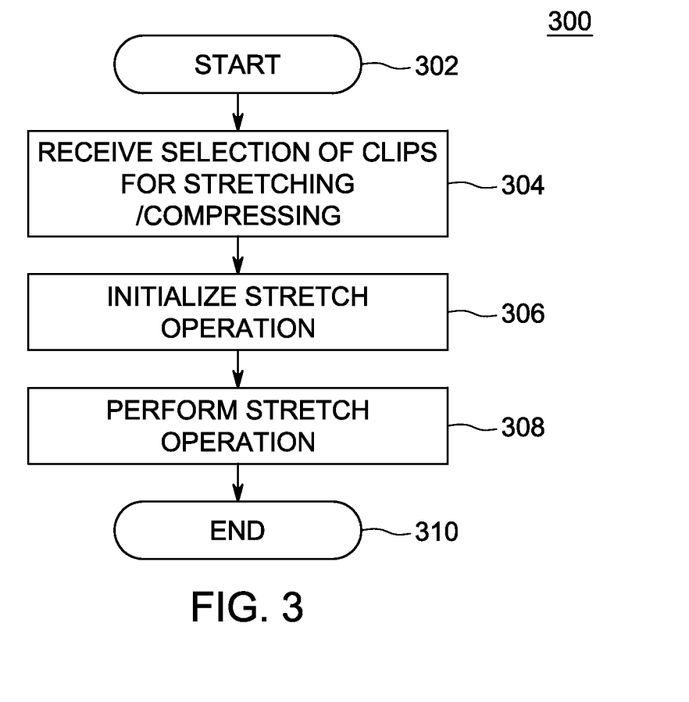
FIG. 3 depicts a flow diagram of a method for maintaining phase coherence when stretching multiple clips in an editing timeline, as performed by the stretch controller of FIG. 1, according to one or more embodiments.

FIG. 3 depicts a flow diagram of a method for maintaining phase coherence when stretching multiple clips in an editing timeline, as performed by the stretch controller 116 of FIG. 1, according to one embodiment of the invention. The method 300 is initiated when a mouse down event occurs on a clip set head or a clip set tail.

The method 300 starts at step 302, and proceeds to step 304. At step 304, the method 200 receives a set of clips for phase coherent stretching. The method 300 proceeds to step 306.

At step 306, the method 300 initializes the stretching operation on at least one of a clip head or a clip tail of a clip selected for stretching. The method 300 sets a stretch anchor for the set of clips and collects information that will be required for the phase coherent stretching. The initialization process is described below with regard to FIG. 4. The method 300 proceeds to step 308.

At step 308, the method 300 performs the stretch operation on the set of clips. The method 300 calculates a stretch ratio and applies the stretch ratio to each clip in the set of clips. The stretch operation is described below with regard to with FIG. 5. The method 300 proceeds to step 310 and ends.

Figure 4:
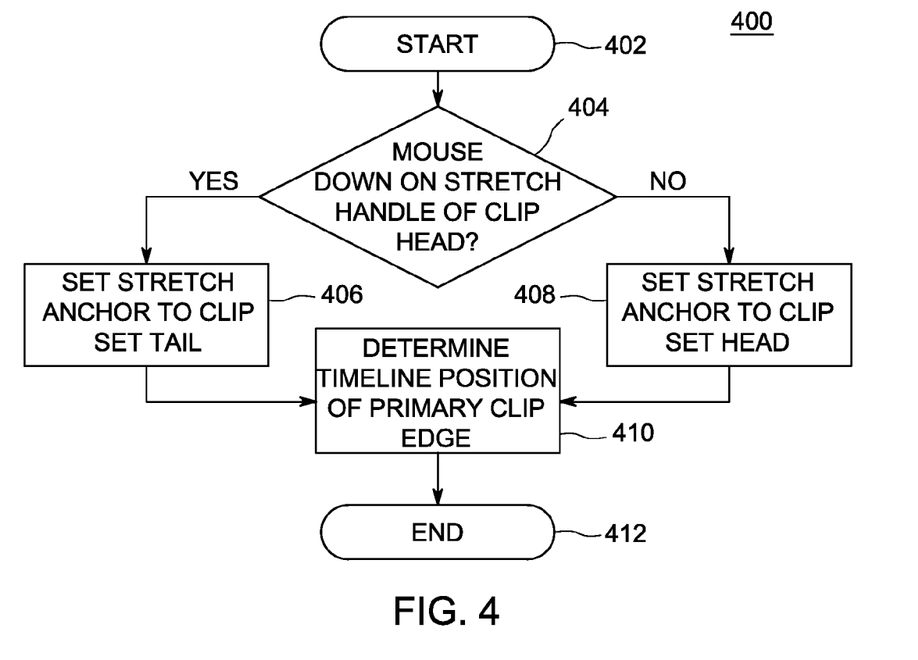
FIG. 4 depicts a flow chart of a method for initializing the stretch operation of FIG. 3, according to one or more embodiments.

FIG. 4 depicts a flow chart of a method 400 for initializing the stretch operation of FIG. 3, according to one or more embodiments. The method 400, according to one embodiment, initializes the stretch operation. The method 400 sets the stretch anchor and determines timeline information required for the phase coherent expansion or compression.

The method 400 starts at 402, and proceeds to step 404. At step 404, a set of clips has been selected for stretching and a mouse down event has occurred on either a clip head or a clip tail. The method 400 determines whether the mouse down event is on a clip head or a clip tail.

If at step 404, the method 400 determines the mouse down event has occurred on a clip head, the method 400 proceeds to step 406. At step 406, the method 400 sets the stretch anchor to the clip set tail. The method 400 proceeds to step 410.

However, if at step 404 the method 400 determines the mouse down event has occurred on a clip tail, the method 400 proceeds to step 408. At step 408, the stretch anchor is set to the clip set head. The method 400 then proceeds to step 410.

At step 410, the method 400 determines the timeline position of the primary clip edge (recall that the primary clip is the clip in the set with which the user has selected for interacting with via the mouse). The gathered information will be used when performing the stretch operation. The method 400 proceeds to step 412 and ends.

Figure 5:
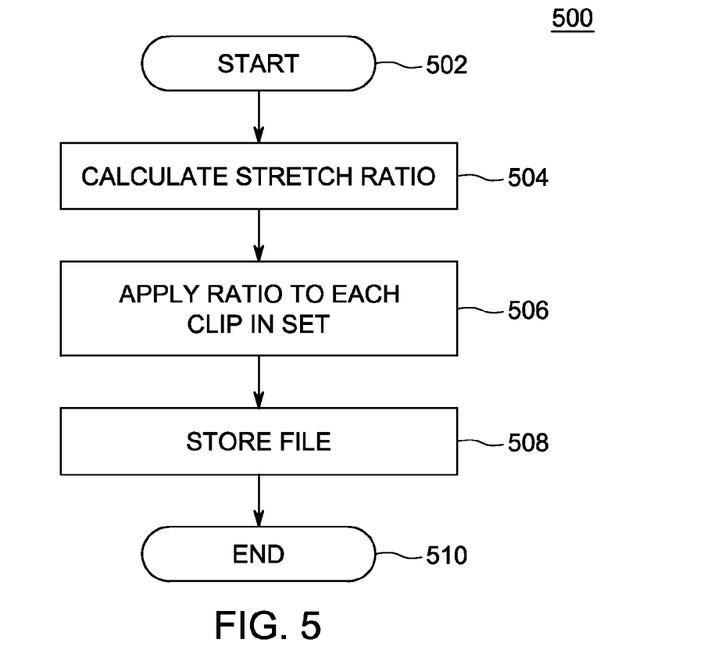
FIG. 5 depicts a flow diagram of a method for performing the stretch operation of FIG. 3, according to one or more embodiments.

FIG. 5 depicts a flow diagram of a method 500 for performing the stretch operation of FIG. 3, according to one or more embodiments.

The method 500, according to one embodiment, facilitates performance of the stretch operation. The method 500 calculates the stretch ratio. The method 500 then applies the stretch ratio to each clip in the selected set and stores the stretched clips.

The method 500 starts 502, and proceeds to step 504. At step 504, the method 500 calculates the stretch ratio. The user performs a mouse down event on the stretch handle. A mouse drag triggers the performance of the stretch operation. The method 500 determines the new timeline position of the primary clip's edge. The method 500 calculates the stretch ratio by applying Equation 1, below:

$$R = B/A, \qquad \text{Equation 1}$$

wherein A is a distance between an original edge position in the timeline of the clip on which the stretching is initiated, such as an edge timeline position corresponding to clip tail 204 of FIG. 2A if clip A was the primary clip, and the stretch anchor 202, and B is a distance between a second edge position in the timeline of the clip on which the stretching is initiated such as an edge timeline position corresponding to clip tail 204 of FIG. 2B for clip A and the stretch anchor 202. The method 500 proceeds to step 506.

At step 506, the method 500 applies the stretch ratio to each clip in the set of clips. The start, in-point, and end positions, of each clip must be adjusted in order to achieve phase coherent stretching. Each clip has its start time, end time, and in-point positions recalculated with each new mouse position. Upon mouse up, the method 500 commits the new clip positions and stretches the clip contents to the specified ratio. The calculations used to apply the phase coherent stretching depend on whether the clips are stretched from the primary clip's head or from the primary clip's tail.

When stretching from the primary clip's head, the application of stretch ratio comprises defining a new start time for each clip selected for stretching by applying the Equation 2 below:

$$S_n = A - (A - S_o) * R,\qquad\text{Equation 2}$$

wherein $S_n$ is the start time for the clip, A is the timeline position of stretch anchor, R is the stretch ratio and $S_o$ is an original start time for the clip.

The method 500 calculates an end time for each clip selected for stretching by applying the Equation 3 below:

$$E_n = A - (A - E_o) * R,\qquad\text{Equation 3}$$

wherein $E_n$=the end time for the clip, A=the stretch anchor, R=the stretch ratio, and $E_o$=an original end time for the clip.

The method 500 calculates an in-point for each clip in the set of clips by applying the Equation 4 below:

$$I_n = I_o * R,\qquad\text{Equation 4}$$

wherein $I_n$=the new in-point, $I_o$=the original in-point, and R=the stretch ratio.

Alternatively, when stretching from the primary clip's tail, the method 500 uses Equations 5, 6, and 7 below:

$$S_n = (S_o - A) * R,\qquad\text{Equation 5}$$

$$E_n = (E_o - A) * R,\qquad\text{Equation 6}$$

$$I_n = I_o * R,\qquad\text{Equation 7}$$

wherein A is the stretch anchor, R is the stretch ratio, $S_n$ is the new start time, $E_n$ is the new end time, $I_n$ is the new in-point, $S_o$ is the original start time, $E_o$ is the original end time and $I_o$ is the original in-point.

The method 500 proceeds to step 508. At step 508, the method 500 stores the stretched clips. The method 500 proceeds to step 510 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 6:
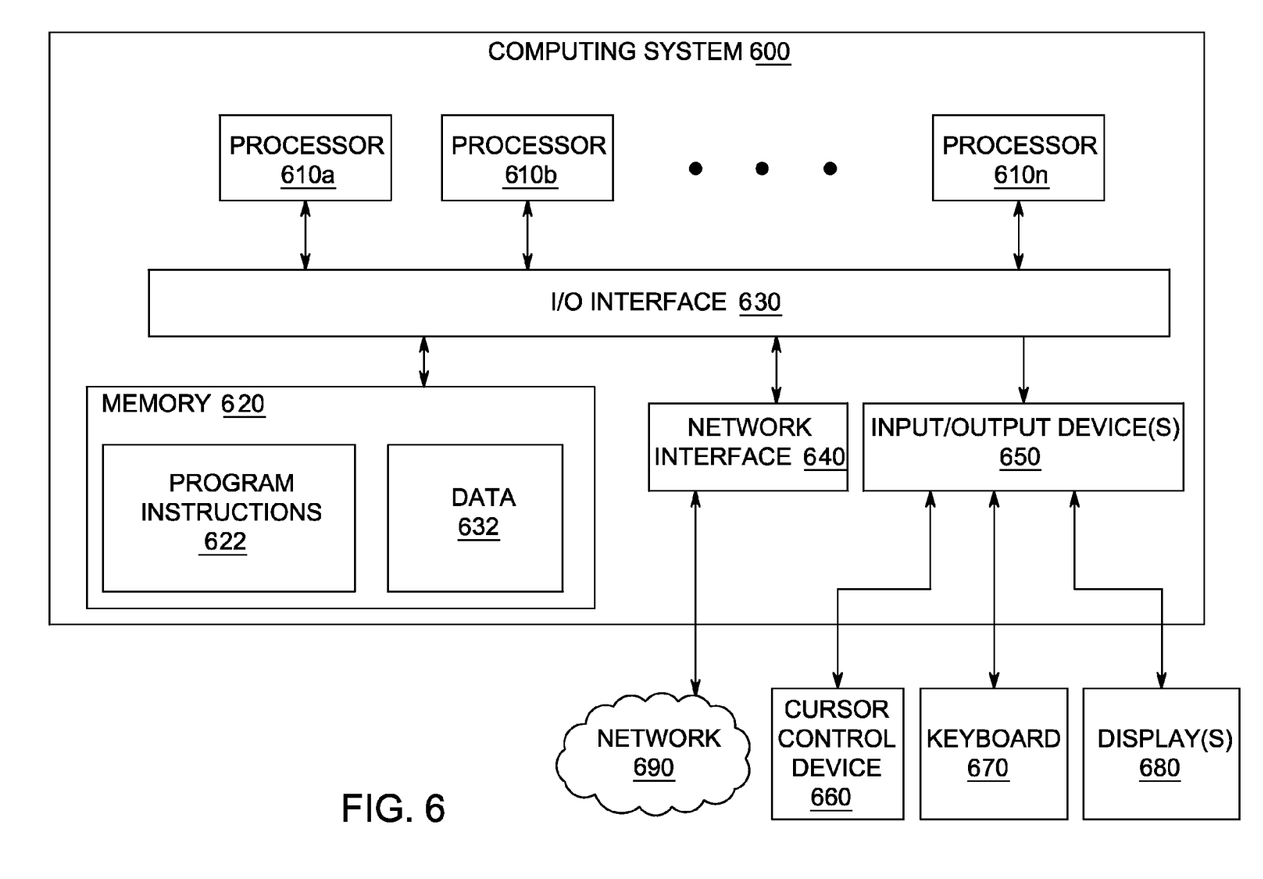
FIG. 6 depicts a computer system that can be utilized in various embodiments of the present invention, according to one or more embodiments.

FIG. 6 depicts a computer system that can be utilized in various embodiments of the present invention, according to one or more embodiments.

Various embodiments of an apparatus and method for providing for phase coherent stretching of media clips on an editing timeline, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement the apparatus and methods described above. The computer system 600 may be used to implement any other system, device, element, functionality or method of the above-described embodiments. In the illustrated embodiments, computer system 600 may be configured to implement methods 200, as processor-executable executable program instructions 622 (e.g., program instructions executable by processor(s) 610*a-n*) in various embodiments.

In the illustrated embodiment, computer system 600 includes one or more processors 610*a-n* coupled to a system memory 620 via an input/output (I/O) interface 630. The computer system 600 further includes a network interface 640 coupled to I/O interface 630, and one or more input/output devices 650, such as cursor control device 660, keyboard 670, and display(s) 680. In various embodiments, any of components may be utilized by the system to receive user input described above. In various embodiments, a user interface (e.g., user interface) may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610a-n may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610a-n may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks (e.g., Bluetooth®, Wi-Fi or WiFi), some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIG. 3. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of phase coherent stretching of audio clips on an editing timeline comprising:
  providing a graphical user interface representing an editing timeline and comprising graphical representations of a plurality of audio clips;
  receiving, by way of the graphical representations of the plurality of audio clips, a selection of a subset of audio clips from the plurality of audio clips for stretching;
  receiving, by way of the graphical user interface, a user interaction with the subset of audio clips, the user interaction comprising a selection and repositioning of a clip head or a clip tail of a first audio clip from the subset of audio clips;
  determining, based on the user interaction, a stretch ratio for the subset of audio clips;
  stretching each audio clip of the subset of audio clips by the stretch ratio, by repositioning both a clip head and a clip tail of each of the subset of audio clips relative to the editing timeline, except for one clip head or clip tail of a second audio clip from the subset of audio clips which is not repositioned, wherein during stretching, each selected audio clip remains synchronized with all other audio clips selected for stretching; and
  selecting, as a stretch anchor, the one clip head or clip tail which is not repositioned, wherein the one clip head or clip tail which is not repositioned is farthest along the editing timeline from the selected and repositioned clip head or clip tail.

2. The method of claim 1, wherein determining a stretch ratio comprises:
  determining a timeline position for the selected and repositioned clip head or clip tail of the first audio clip, and
  calculating the stretch ratio based on a change in timeline position between the selected and repositioned clip head or clip tail and the stretch anchor.

3. The method of claim 2, wherein determining a stretch ratio further comprises determining a first timeline position and a second timeline position for the selected and repositioned clip head or clip tail, wherein a distance between the first timeline position and the second timeline position represents a desired amount of stretch.

4. The method of claim 3, wherein calculating a stretch ratio comprises applying the formula: $R=B/A$, where A is a distance between the first timeline position and the stretch anchor, and B is a distance between the second timeline position and the stretch anchor.

5. The method of claim 4, wherein applying the stretch ratio comprises defining a start time for each clip of the subset of audio clips by applying the formula: $S_n=A-(A-S_o)*R$, wherein $S_n$ is the start time for a given clip, A is the stretch anchor, R is the stretch ratio, and $S_o$ is an original start time for the given clip.

6. The method of claim 5, wherein applying the stretch ratio further comprises defining an end time for each clip of the subset of audio clips by applying the formula $E_n=A-(A-E_o)*R$, wherein $E_n$ is the end time for the given clip, A is the stretch anchor, R is the stretch ratio, and $E_o$ is an original end time for the given clip.

7. A non-transitory computer readable medium storing computer instructions that, when executed by at least one processor cause the at least one processor to perform a method of phase coherent stretching of a plurality of audio clips on an editing timeline comprising:
  providing a graphical user interface representing an editing timeline and comprising graphical representations of a plurality of audio clips;
  receiving, by way of the graphical representations of the plurality of audio clips, a selection of a subset of audio clips from the plurality of audio clips for stretching;
  receiving, by way of the graphical user interface, a user interaction with the subset of audio clips, the user interaction comprising a selection and repositioning of a clip head or a clip tail of a first audio clip from the subset of audio clips;
  determining, based on the user interaction, a stretch ratio for the subset of audio clips;
  stretching each audio clip of the subset of audio clips by the stretch ratio, by repositioning both a clip head and a clip tail of each of the subset of audio clips relative to the editing timeline, except for one clip head or clip tail of a second audio clip from the subset of audio clips which is not repositioned, wherein during stretching, each selected audio clip remains synchronized with all other audio clips selected for stretching; and
  selecting, as a stretch anchor, the one clip head or clip tail which is not repositioned, wherein the one clip head or clip tail which is not repositioned is farthest along the editing timeline from the selected and repositioned clip head or clip tail.

8. The computer readable medium of claim 7, wherein determining a stretch ratio comprises:

determining a timeline position for the selected and repositioned clip head or clip tail of the first audio clip, and calculating the stretch ratio based on a change in timeline position between the selected and repositioned clip head or clip tail and the stretch anchor.

9. The computer readable medium of claim 8, wherein determining a stretch ratio further comprises determining a first timeline position and a second timeline position for the selected and repositioned clip head or clip tail, wherein a distance between the first timeline position and the second timeline position represents a desired amount of stretch.

10. The computer readable medium of claim 9, wherein calculating a stretch ratio comprises applying the formula: $R=B/A$, where A is a distance between the first timeline position and the stretch anchor, and B is a distance between the second timeline position and the stretch anchor.

11. The computer readable medium of claim 8, wherein applying the stretch ratio comprises defining a start time for each clip of the subset of audio clips by applying the formula: $Sn=A-(A-S_o)*R$, wherein $S_n$ is the start time for a given clip, A is the stretch anchor, R is the stretch ratio, $S_o$ is an original start time for the given clip.

12. The computer readable medium of claim 8, wherein applying the stretch ratio further comprises defining an end time for each clip of the subset of audio clips by applying the formula $E_n=A-(A-E_o)*R$, wherein $E_n$ is the end time for the given clip, A is the stretch anchor, R is the stretch ratio, and $E_o$ is an original end time for the given clip.

13. An apparatus for phase coherent stretching of audio clips on an editing timeline comprising:
 a display device displaying a graphical user interface representing an editing timeline and comprising graphical representations of a plurality of audio clips in an editing timeline;
 a stretch controller which, in response to a selection of a subset of the plurality audio clips and a user interaction with the subset of audio clips comprising a selection and repositioning of a clip head or a clip tail of a first audio clip from the subset of audio clips, stretches each of the subset of audio clips by repositioning both of a clip head and a clip tail of each of the subset of audio clips relative to the editing timeline, except for one clip head or clip tail of a second audio clip from the subset of audio clips which is not repositioned, and selects, as a stretch anchor, the one clip head or clip tail which is not repositioned, wherein the one clip head or clip tail which is not repositioned is farthest along the editing timeline from the selected and repositioned clip head or clip tail, and wherein during stretching, each selected audio clip remains synchronized with all other audio clips selected for stretching; and
 a memory storing the subset of audio clips.

14. The apparatus of claim 13, wherein the stretch controller stretches each of the subset of audio clips relative to one or more other audio clips of the plurality of audio clips.

15. The apparatus of claim 14, wherein the stretch controller determines a timeline position for the selected and repositioned clip head or clip tail, calculates a stretch ratio, and applies the stretch ratio to each clip in the subset of audio clips to stretch each of the subset of audio clips.

16. The apparatus of claim 15, wherein the stretch controller selects the stretch anchor by determining a time position of an edge of the second audio clip farthest away from the first audio clip.

17. The apparatus of claim 15, wherein the stretch controller calculates a stretch ratio by applying the formula: $R=B/A$, where A is a distance between an original edge position of the first audio clip on which the stretching is initiated and the stretch anchor, and B is a distance between a second edge position of the first audio clip on which the stretching is initiated and the stretch anchor.

18. The apparatus of claim 15, wherein the stretch controller applies the stretch ratio by defining a start time for each of the subset of audio clips by applying the formula: $S_n=A-(A-S_o)*R$, and defining an end time for each of the subset of audio clips by applying the formula $E_n=A-(A-E_o)*R$, wherein $S_n$ is the start time for a given audio clip, A is the stretch anchor, R is the stretch ratio, $S_o$ is an original start time for the given audio clip, $E_n$ is the end time for the given audio clip, and $E_o$ is an original end time for the given audio clip.

* * * * *